United States Patent
Yoshida et al.

(10) Patent No.: US 12,331,219 B2
(45) Date of Patent: Jun. 17, 2025

(54) ADHESIVE COMPOSITION

(71) Applicant: KAO CORPORATION, Tokyo (JP)

(72) Inventors: Yutaka Yoshida, Wakayama (JP); Rinako Hano, Wakayama (JP); Kyohei Yamato, Wakayama (JP)

(73) Assignee: KAO CORPORATION, Tokyo (JP)

(*) Notice: Subject to any disclaimer, the term of this patent is extended or adjusted under 35 U.S.C. 154(b) by 360 days.

(21) Appl. No.: 17/914,412

(22) PCT Filed: Jun. 1, 2021

(86) PCT No.: PCT/JP2021/020901
§ 371 (c)(1),
(2) Date: Sep. 26, 2022

(87) PCT Pub. No.: WO2021/246419
PCT Pub. Date: Dec. 9, 2021

(65) Prior Publication Data
US 2023/0108238 A1    Apr. 6, 2023

(30) Foreign Application Priority Data

Jun. 3, 2020 (JP) .................................. 2020-097159

(51) Int. Cl.
*C09J 11/08* (2006.01)
(52) U.S. Cl.
CPC .......... *C09J 11/08* (2013.01); *C09J 2301/312* (2020.08); *C09J 2301/408* (2020.08); *C09J 2400/16* (2013.01)
(58) Field of Classification Search
CPC ........................... C09J 11/08; C09J 2301/312; C09J 2301/408; C09J 2400/16; C09J 163/00
USPC ....................................................... 156/336
See application file for complete search history.

(56) References Cited

U.S. PATENT DOCUMENTS

| | | | |
|---|---|---|---|
| 11,959,194 B2 * | 4/2024 | Fukui | D06M 11/05 |
| 2019/0023859 A1 | 1/2019 | Yoshida et al. | |
| 2020/0109319 A1 | 4/2020 | Yoshino et al. | |

FOREIGN PATENT DOCUMENTS

| | | |
|---|---|---|
| CN | 107949605 A | 4/2018 |
| CN | 110431167 A | 11/2019 |
| JP | 2014132072 A | 7/2014 |
| JP | 2016138220 A | 8/2016 |
| JP | 2017165956 A | 9/2017 |
| JP | 2018044097 A | 3/2018 |
| JP | 2019094388 A | 6/2019 |
| JP | 2020076075 A | 5/2020 |

OTHER PUBLICATIONS

International Search Report issued Aug. 17, 2021 in PCT/JP2021/020901, 3 pages.
Combined Chinese Office Action and Search Report issued Nov. 25, 2023 in Chinese Patent Application No. 202180032705.X, 4 pages.
Extended European Search Report issued May 7, 2024 in corresponding European Patent Application No. 21817781.4, 7 pages.

* cited by examiner

*Primary Examiner* — James D Sells
(74) *Attorney, Agent, or Firm* — Element IP, PLC

(57) ABSTRACT

The present invention relates to an adhesive composition containing (a) modified cellulose fibers having a cellulose I crystal structure, an average fiber length of 1000 nm or less, and an average fiber diameter of 1 nm or more and 300 nm or less; and (b) a resin. According to the present invention, an adhesive composition having excellent mechanical strength such as shearing adhesive strength can be provided. The adhesive composition of the present invention described above can be utilized in structural adhesion of vehicle assembly products and the like.

18 Claims, No Drawings

ADHESIVE COMPOSITION

FIELD OF THE INVENTION

The present invention relates to an adhesive composition and an adhesion method.

BACKGROUND OF THE INVENTION

Recently, techniques that are environmentally friendly have been captured spotlight. Under the technical background, materials using cellulose fibers which are biomass abundantly existing in nature have been remarked.

For example, Patent Publication 1 discloses an adhesive composition containing a non-water-soluble resin, and fine cellulose fibers containing an ionic group and/or a fine cellulose fiber composite comprising fine cellulose fibers containing an ionic group bound with a modifying group.

In addition, Patent Publication 2 discloses a composition for adhesives, characterized in that the composition contains a fine fibrous cellulose and a matrix resin that satisfies the following conditions (A) to (E):

(A) a number-average fiber diameter being 2 nm or more and 500 nm or less;
(B) an average aspect ratio being 10 or more and 1000 or less;
(C) having a cellulose I crystal structure;
(D) having an anionic functional group; and
(E) a particular polyether amine being bound to a part or all of the anionic functional groups of (D).

Patent Publication 1: Japanese Patent Laid-Open No. 2019-94388
Patent Publication 2: Japanese Patent Laid-Open No. 2018-44097

SUMMARY OF THE INVENTION

The present invention relates to the following [1] to [3]:
[1] An adhesive composition containing
modified cellulose fibers having a cellulose I crystal structure, an average fiber length of 1000 nm or less, and an average fiber diameter of 1 nm or more and 300 nm or less; and a resin.
[2] An adhesion method including adhering a structure with an adhesive composition containing
modified cellulose fibers having a cellulose I crystal structure, an average fiber length of 1000 nm or less, and an average fiber diameter of 1 nm or more and 300 nm or less; and a resin.
[3] An adhesion method including adhering a metal member with an adhesive composition containing
modified cellulose fibers having a cellulose I crystal structure, an average fiber length of 1000 nm or less, and an average fiber diameter of 1 nm or more and 300 nm or less; and a resin.

DETAILED DESCRIPTION OF THE INVENTION

Adhesives (or adhesive compositions) have different properties required depending upon the physical properties of an object to be adhered.

The present invention relates to the provision of an adhesive composition and an adhesion method having excellent mechanical strength (for example, shearing adhesive strength) when used in a metal member or the like of a structure.

According to the present invention, an adhesive composition and an adhesion method having excellent mechanical strength (for example, shearing adhesive strength) can be provided.

Although the detailed mechanisms for exhibiting the above effects by the adhesive composition of the present invention are not elucidated, they are assumed as follows. Since modified cellulose fibers are present in the interface of an object to be adhered and a resin, the adhesiveness of the resin to an adhesion surface is improved, and the mechanical strength is improved, even though the smoothness of an adhesion surface of a material that serves as an object to be adhered (for example, metal and/or plastics) is somewhat lowered. This is assumed to be due to fact that the adhesive composition of the present invention inhibits heat shrinkage during adhesion.

The adhesive composition of the present invention contains
modified cellulose fibers having a cellulose I crystal structure, an average fiber length of 1000 nm or less, and an average fiber diameter of 1 nm or more and 300 nm or less; and
a resin.

[Modified Cellulose Fibers]

The modified cellulose fibers in the present invention refer to cellulose fibers having a cellulose I crystal structure, an average fiber length of 1000 nm or less, and an average fiber diameter of 1 nm or more and 300 nm or less, wherein the cellulose fibers are bound with a modifying group. It is preferable that the modifying group binds to a part or all of hydroxy groups of the cellulose fibers, or a carboxy group in which a group at C6 position of glucose unit ($-CH_2OH$) is converted to a carboxy group.

It is preferable that the modifying group contains one or more members selected from the group consisting of (a) hydrocarbon groups, (b) silicone chains, and (c) alkylene oxide chains. In addition, it is preferable that the cellulose fibers to which a modifying group binds are anionically modified cellulose fibers, from the viewpoint of easiness in binding a modifying group.

(Anionically Modified Cellulose Fibers)

The anionically modified cellulose fibers are cellulose fibers having one or more groups in the molecule selected from the group consisting of anionic groups, e.g., carboxy groups, phosphate (phosphite) group, and sulfonate group. The introduction of an anionic group to cellulose fibers can be accomplished by a method described later. From the viewpoint of easy availability and effects, anionically modified cellulose fibers having a carboxy group as an anionic group are preferred, and anionically modified cellulose fibers in which a group at C6 position of the glucose unit ($-CH_2OH$) constituting the cellulose fibers is selectively converted to a carboxy group (referred to as "oxidized cellulose fibers") are more preferred. Here, the ion (counterion) pairing the anionic group is preferably proton.

The anionic group content in the anionically modified cellulose fibers is preferably 0.1 mmol/g or more, more preferably 0.4 mmol/g or more, even more preferably 0.6 mmol/g or more, even more preferably 0.7 mmol/g or more, and even more preferably 0.8 mmol/g or more, from the viewpoint of stable introduction of the modifying group and increase in adhesive strength by introduction of the modifying group. In addition, the anionic group content is preferably 3 mmol/g or less, more preferably 2.5 mmol/g or less, more preferably 2 mmol/g or less, more preferably 1.9 mmol/g or less, even more preferably 1.8 mmol/g or less, more preferably 1.7 mmol/g or less, and even more preferably 1.5 mmol/g or less, from the viewpoint of improving handling properties. Here, "the anionic group content" means a total amount of anionic groups in the glucose constituting the cellulose fibers, which is specifically measured in accordance with a method described in Examples set forth later.

Binding of the modifying group to an anionic group of the anionically modified cellulose fibers means that a modifying group binds to an anionic group, preferably a carboxy group, owned by the anionically modified cellulose fibers. The binding form of the modifying group and the anionic group includes, for example, an ionic bonding and/or a covalent bonding. The covalent bonding includes, for example, an amide bonding, an ester bonding, and a urethane bonding, and an amide bonding is preferred.

(Modifying Group)

The modifying group includes (a) hydrocarbon groups, (b) silicone chains, and (c) alkylene oxide chains. These modifying groups may bind (or may be introduced) to the cellulose fibers, alone in a single kind, or in combination of two or more kinds.

(a) Hydrocarbon Group

The hydrocarbon group includes monovalent hydrocarbon groups, for example, chained saturated hydrocarbon groups, chained unsaturated hydrocarbon groups, cyclic saturated hydrocarbon groups, and (heterocyclic) aromatic hydrocarbon groups.

The number of carbon atoms of the hydrocarbon group is 1 or more, preferably 3 or more, more preferably 8 or more, and even more preferably 10 or more, from the viewpoint of increasing adhesive strength, and the number of carbon atoms is preferably 30 or less, more preferably 22 or less, and even more preferably 18 or less, from the same viewpoint. The hydrocarbon group may have a substituent described later, and a part of the hydrocarbon group may be substituted with a hydronitride group.

The chained saturated hydrocarbon group preferably has 3 or more carbon atoms and 30 or less carbon atoms, and specific examples thereof include, for example, a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl group, a docosyl group, an octacosanyl group, and the like.

The chained unsaturated hydrocarbon group preferably has 3 or more carbon atoms and 30 or less carbon atoms, and specific examples thereof include, for example, a propenyl group, a butenyl group, an isobutenyl group, an isoprenyl group, a pentenyl group, a hexenyl group, a heptenyl group, an octenyl group, a nonenyl group, a decenyl group, a dodecenyl group, a tridecenyl group, a tetradecenyl group, and an octadecenyl group.

The cyclic saturated hydrocarbon group preferably has 3 or more carbon atoms and 20 or less carbon atoms, and specific examples thereof include, for example, a cyclopropyl group, a cyclobutyl group, a cyclopentyl group, a cyclohexyl group, a cycloheptyl group, a cyclooctyl group, a cyclononyl group, a cyclodecyl group, a cyclododecyl group, a cyclotridecyl group, a cyclotetradecyl group, a cyclooctadecyl group, and the like.

The aromatic hydrocarbon group includes, for example, aryl groups and aralkyl groups and the like. As the aryl group and the aralkyl group, those groups in which these groups are substituted or unsubstituted with a substituent given later may be used.

The heterocyclic aromatic hydrocarbon group includes an imidazole group.

A total number of the carbon atoms of the aryl group is preferably 6 or more and 24 or less. Specific examples of the aryl group include, for example, a phenyl group, a naphthyl group, an anthryl group, a phenanthryl group, a biphenyl group, a triphenyl group, a terphenyl group, and groups in which these groups are substituted with a substituent given later.

A total number of the carbon atoms of the aralkyl group is preferably 7 or more and 24 or less. Specific examples of the aralkyl group include, for example, a benzyl group, a phenethyl group, a phenylpropyl group, a phenylpentyl group, a phenylhexyl group, a phenylheptyl group, a phenyloctyl group, and groups in which an aromatic group of these groups is further substituted with a substituent given later.

A total number of the carbon atoms of the imidazole group is preferably 3 or more and 24 or less. Specific examples of the imidazole group include, for example, an imidazole group, a methylimidazole group, an ethylimidazole group, a propylimidazole group, a 2-phenylimidazole group, a benzimidazole group, and groups in which an aromatic group of these groups is further substituted with a substituent.

(b) Silicone Chain

The silicone chain is a monovalent group of which main chain is a siloxane bonding, which may further be accompanied with an alkylene group. The silicone chain may have a substituent described later.

(c) Alkylene Oxide Chain

The alkylene oxide chain is a structure containing a (co)polymer of ethylene oxide (EO) and propylene oxide (PO), which is preferably one or more structures selected from the group consisting of a structure containing a polymer of EOs (EO chain), a structure containing a polymer of POs (PO chain), and a structure containing a copolymer in which EO and PO are polymerized in a random or block form ((EO/PO) chain). The hydrocarbon chain may be further bound to the alkylene oxide chain.

The alkylene oxide chain includes, for example, a group represented by the following formula:

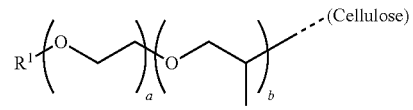

wherein $R^1$ is a hydrogen atom, a hydrocarbon group having 1 or more carbon atoms and 6 or less carbon atoms, or a —$CH_2CH(CH_3)NH_2$ group; EO and PO are present in a random or block form; a is 0 or a positive number showing an average number of moles added of EO; b is 0 or a positive number showing an average number of moles added of PO, with proviso that a case where both a and b are 0 is excluded.

a in the above formula shows an average number of moles added of EO, which is preferably 0 or more, more preferably 1 or more, and even more preferably 2 or more, from the viewpoint of availability and affinity with the resin, and preferably 100 or less, and more preferably 70 or less, from the same viewpoint.

b in the above formula shows an average number of moles added of PO, which is preferably 0 or more, more preferably 1 or more, and even more preferably 3 or more, from the viewpoint of affinity with the resin, and preferably 50 or less, and more preferably 40 or less, from the viewpoint of availability.

Specific examples of the hydrocarbon group having 1 or more carbon atoms and 6 or less carbon atoms of $R^1$ of the above formula include a methyl group, an ethyl group, a propyl group, an isopropyl group, a butyl group, a sec-butyl group, a tert-butyl group, an isobutyl group, a pentyl group, a tert-pentyl group, an isopentyl group, a hexyl group, an isohexyl group, and the like.

The formula weight (molecular weight) of the alkylene oxide chain is preferably 500 or more, and more preferably 1,000 or more, and on the other hand, preferably 10,000 or less, and more preferably 7,000 or less. The formula weight of the alkylene oxide chain can be obtained by calculation from an average number of moles thereof when an amine compound having an alkylene oxide chain described later is produced.

The content ratio (mol %) of PO in the (EO/PO) chain is preferably 1 mol % or more, and more preferably 5 mol % or more, from the viewpoint of increasing adhesive strength, and on the other hand the content ratio is preferably 100 mol % or less, more preferably 95 mol % or less, and even more preferably 90 mol % or less, from the same viewpoint. The content ratio of PO in the (EO/PO) chain can be obtained by calculation from an average number of moles thereof when an amine compound having an alkylene oxide chain described later is produced.

The alkylene oxide chain may have the following substituents.

(d) Further Substituents

Further, the modifying group may further have a substituent. The substituent includes, for example, alkoxy groups having from 1 to 6 carbon atoms, such as a methoxy group, an ethoxy group, a propoxy group, an isopropoxy group, a butoxy group, an isobutoxy group, a sec-butoxy group, a tert-butoxy group, a pentyloxy group, an isopentyloxy group, and a hexyloxy group; alkoxy-carbonyl groups of which alkoxy group has 1 to 6 carbon atoms such as a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, a pentyloxycarbonyl group, and an isopentyloxycarbonyl group; halogen atoms such as a fluorine atom, a chlorine atom, a bromine atom, and an iodine atom; acyl groups having from 1 to 6 carbon atoms such as an acetyl group and a propionyl group; aralkyl groups; aralkyloxy groups; alkylamino groups having from 1 to 6 carbon atoms; dialkylamino group of which alkyl group has from 1 to 6 carbon atoms; and a hydroxy group.

[Method for Producing Modified Cellulose Fibers]

The modified cellulose fibers can be produced, for example, by introducing raw material cellulose fibers with an anionic group to produce anionically modified cellulose fibers (step 1), and binding the anionically modified cellulose fibers with a modifying group at an anionic group (step 2).

(Step 1)

Raw Material Cellulose Fibers

The cellulose fibers which are raw materials for the anionically modified cellulose fibers are preferably natural cellulose, from the environmental viewpoint. The natural cellulose includes, for example, those from wooden pulp such as pulp from needle-leaf trees and pulp from broad-leaf trees; cotton pulp from cotton linter and cotton lint; non-wooden pulp such as maize straw pulp and bagasse pulp; bacteria cellulose; and the like. These can be used alone or in a combination of two or more kinds.

The average fiber diameter of the raw material cellulose fibers is, but not particularly limited to, preferably 5 µm or more, and more preferably 7 µm or more, from the viewpoint of handling properties and costs, and the average fiber diameter is preferably 500 µm or less, and more preferably 300 µm or less, from the same viewpoint. The average fiber diameter of the raw material cellulose fibers can be measured in accordance with the method described in Examples set forth below.

In addition, the average fiber length of the raw material cellulose fibers is, but not particularly limited to, preferably 5 µm or more, and more preferably 25 µm or more, from the viewpoint of availability and costs, and the average fiber length is preferably 5,000 µm or less, and more preferably 3,000 µm or less, from the same viewpoint. The average fiber length of the raw material cellulose fibers can be measured in accordance with the method described in Examples set forth below.

Treatment Methods (1) A Case where the Cellulose Fibers are Introduced with a Carboxy Group as an Anionic Group The method for introducing cellulose fibers with a carboxy group includes, for example, a method of oxidizing a hydroxy group of cellulose fibers to convert the hydroxy group to a carboxy group; and a method of treating a hydroxy group of cellulose fibers with at least one member selected from the group consisting of compounds having a carboxy group, acid anhydrides of compounds having a carboxy group, and derivatives thereof.

The method of subjecting the cellulose fibers to an oxidization treatment at a hydroxy group includes, for example, a method of treating the raw material cellulose fibers with an oxidizing agent such as sodium hypochlorite and a bromide such as sodium bromide using 2,2,6,6-tetramethyl-1-piperidine-N-oxyl (TEMPO) as a catalyst, as described in Japanese Patent Laid-Open No. 2015-143336 or 2015-143337. By carrying out oxidation of the cellulose fibers using TEMPO as a catalyst, a group at C6 position of the glucose of the cellulose fiber constituting unit is selectively converted to a carboxy group, whereby the above-mentioned oxidized cellulose fibers can be obtained.

The compound having a carboxy group for use in the introduction of cellulose fibers with a carboxy group is not particularly limited, and specific examples include halogenated acetic acids. The halogenated acetic acid includes chloroacetic acid, and the like.

The acid anhydride of the compound having a carboxy group and derivatives thereof, for use in the introduction of cellulose fibers with a carboxy group include, but not particularly limited to, acid anhydrides of dicarboxylic acid compounds such as maleic anhydride, succinic anhydride, phthalic anhydride, and adipic anhydride; imidation products of the acid anhydrides of a compound having a carboxy group; and derivatives of the acid anhydrides of a compound having a carboxyl group. These compounds may be substituted with a hydrophobic group.

(2) A Case where Cellulose Fibers are Introduced with a Sulfonate Group or a Phosphate (Phosphite) Group as an Anionic Group The method of introducing cellulose fibers with a sulfonate group includes a method of adding sulfuric acid to cellulose fibers and heating, and the like.

The method of introducing cellulose fibers with a phosphate (phosphite) group includes a method of mixing cellulose fibers which are in a dry state or a wet state with a powder or an aqueous solution of phosphoric (phosphorous) acid or a phosphoric (phosphorous) acid derivative; a method of adding an aqueous solution of phosphoric (phosphorous) acid or a phosphoric (phosphorous) acid derivative to a dispersion of cellulose fibers; and the like. When these methods are employed, a dehydration treatment, a heating treatment and the like are generally carried out after mixing or adding a powder or an aqueous solution of phosphoric (phosphorous) acid or a phosphoric (phosphorous) acid derivative.

(Step 2)

The introduction of the anionically modified cellulose fibers with a modifying group at an anionic group is accomplished by treating anionically modified cellulose fibers with a compound for introducing a modifying group at an anionic group (called "compound for modification"). As the method for introduction with a modifying group, (1) a case of introduction via an ionic bonding can be referred to Japanese Patent Laid-Open No. 2015-143336, or (2) a case of introduction via an amide bonding can be referred to Japanese Patent Laid-Open No. 2015-143337.

After the termination of step 2, in order to remove unreacted compounds and the like, a post-treatment may be appropriately carried out. As the method of post-treatment, for example, filtration, centrifugation, dialysis, or the like can be used.

(1) Embodiment of Introduction via Ionic Bonding

In the case of the introduction with a modifying group via an ionic bonding, anionically modified cellulose fibers and a compound for modification may be mixed, whereby an ionic bonding is formed between an anionic group contained in the anionically modified cellulose fibers and an amino group of the compound for modification.

Specifically, when oxidized cellulose fibers are used as anionically modified cellulose fibers and a primary amine having the above modifying group is used as a compound for modification, the glucose constituting the cellulose fibers can be introduced with a modifying group mentioned above at a carboxy group of position C6 via an ionic bonding, as shown in the formula given below:

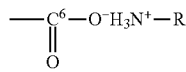

wherein $C^6$ is a carbon atom at position 6 of the glucose constituting the cellulose fibers; and R is a modifying group.

Compound for Modification

The compound for modification used in this embodiment may be any compounds capable of introducing a desired modifying group, which preferably includes amine compounds having hydrocarbon groups, alkylene oxide chains, or silicone chains, as mentioned above, phosphonium compounds, guanidino group-containing compounds, and the like.

Amine Compound

The amine compound is, for example, an amine compound having, as a modifying group, a hydrocarbon group mentioned above, an alkylene oxide chain mentioned above, or a silicone chain mentioned above, in which the anionically modified cellulose fibers are introduced with a hydrocarbon group or the like via an ionic bonding, to serve as a modifying group in the modified cellulose fibers.

The amine compound may be any one of primary amines, secondary amines, tertiary amines, and quaternary ammonium compounds. The anionic component of the quaternary ammonium compound preferably includes halogen ions such as chloride ions and bromide ions, hydrogensulfate ions, perchlorate ions, tetrafluoroborate ions, hexafluorophosphate ions, trifluoromethanesulfonate ions, and hydroxy ions, from the viewpoint of the reactivities.

Amine Compound Having Hydrocarbon Group

As specific examples of the amine compound having a hydrocarbon group, the primary to tertiary amines include, for example, ethylamine, diethylamine, triethylamine, propylamine, dipropylamine, butylamine, dibutylamine, hexylamine, 2-ethylhexylamine, dihexylamine, trihexylamine, octylamine, dioctylamine, trioctylamine, dodecylamine, didodecylamine, stearylamine, distearylamine, monoethanolamine, diethanolamine, triethanolamine, oleylamine, aniline, octadecylamine, dimethylbehenylamine, benzylamine, naphthylamine, imidazole, 2-methylimidazole, 2-ethylimidazole, 2-phenylimidazole, 2-ethyl methylimidazole, 2-phenyl-4-methylimidazole, 1-(3-aminopropyl)imidazole, and the like.

The quaternary ammonium compound includes, for example, tetramethylammonium hydroxide (TMAH), tetraethylammonium hydroxide (TEAH), tetraethylammonium chloride, tetrapropylammonium hydroxide (TPAH), tetrabutylammonium hydroxide (TBAH), tetrabutylammonium chloride, lauryltrimethylammonium chloride, dilauryldimethyl chloride, stearyltrimethylammonium chloride, distearyldimethylammonium chloride, cetyltrimethylammonium chloride, and an alkylbenzyldimethylammonium chloride.

As the amine compound having a hydrocarbon group, a commercially available product is used, or an amine compound can be prepared according to a known method.

Amine Compound Having Alkylene Oxide Chain

It is preferable that an alkylene oxide chain and a nitrogen atom of the amine compound, in the amine compound are bound directly or via a linking group. The linking group is preferably a hydrocarbon group, which includes an alkylene group having preferably 1 or more carbon atoms and 6 or less carbon atoms, and more preferably 1 or more carbon atoms and 3 or less carbon atoms. It is preferable that the alkylene group is, for example, an ethylene group and a propylene group.

The amine having an alkylene oxide chain includes, for example, a compound represented by the following formula (i):

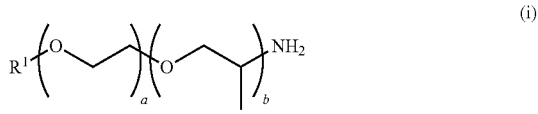

$R^1$, a and b in the formula (i) are the same as defined in $R^1$, a and b in the formula showing one example of the alkylene oxide chain mentioned above.

The amine compound having an alkylene oxide chain can be prepared in accordance with a known method. For example, ethylene oxides and propylene oxides may be added in desired amounts to a propylene glycol alkyl ether, and thereafter a hydroxy group terminal may be formed into an amino group. The alkyl ether can be opened with an acid as needed so as to have a hydrogen atom at a terminal. These production methods can be referred to Japanese Patent Laid-Open No. Hei-3-181448, and the details of the amine compound are described, for example, in Japanese Patent Gazette No. 6,105,139.

As the amine compound having an alkylene oxide chain, for example, a commercially available product can be suitably used, and specific examples include Jeffamine M-2070, Jeffamine M-2005, Jeffamine M-2095, Jeffamine M-1000, Jeffamine M-600, Surfoamine B200, Surfoamine L100, Surfoamine L200, Surfoamine L207, Surfoamine L300, Surfoamine B-100, XTJ-501, XTJ-506, XTJ-507, XTJ-508, M3000, Jeffamine ED-900, Jeffamine ED-2003, Jeffamine D-2000, Jeffamine D-4000, XTJ-510, Jeffamine T-3000, Jeffamine T-5000, XTJ-502, XTJ-509, XTJ-510, etc. manufactured by HUNTSMAN; SUNBRIGHT MEPA-10H, SUNBRIGHT MEPA-20H, SUNBRIGHT MEPA-50H, SUNBRIGHT MEPA-10T, SUNBRIGHT MEPA-12T, SUNBRIGHT MEPA-20T, SUNBRIGHT MEPA-30T, SUNBRIGHT MEPA-40T, manufactured by NOF Corporation; and the like. These may be used alone or in a combination of two or more kinds.

Amine Compound Having Silicone Chain

The amine compound includes, for example, a compound having a structure in which the backbone of a silicone chain is bound with an amino group via an alkylene group or the like. The amine compound as used herein may be referred to as an "amino-modified silicone." As the amino-modified silicone, a commercially available product is used, or a compound can be prepared in accordance with a known method. The amino-modified silicone may be used alone or in a combination of two or more kinds.

The amino-modified silicone is preferably TSF4703 (kinetic viscosity: 1,000, amino equivalence: 1,600) and TSF4708 (kinetic viscosity: 1,000, amino equivalence: 2,800), manufactured by Momentive Performance Materials, Inc.; SS-3551 (kinetic viscosity: 1,000, amino equivalence: 1,600), SF8457C (kinetic viscosity: 1,200, amino equivalence: 1,800), SF8417 (kinetic viscosity: 1,200, amino equivalence: 1,700), BY16-209 (kinetic viscosity: 500, amino equivalence: 1,800), BY16-892 (kinetic viscosity: 1,500, amino equivalence: 2,000), BY16-898 (kinetic viscosity: 2,000, amino equivalence: 2,900), FZ-3760 (kinetic viscosity: 220, amino equivalence: 1,600), manufactured by Dow Corning-Toray Silicone Co., Ltd.; KF-8002 (kinetic viscosity: 1,100, amino equivalence: 1,700), KF-867 (kinetic viscosity: 1,300, amino equivalence: 1,700), KF-864 (kinetic viscosity: 1,700, amino equivalence: 3,800), BY16-213 (kinetic viscosity: 55, amino equivalence: 2,700), BY16-853U (kinetic viscosity: 14, amino equivalence: 450), manufactured by Shin-Etsu Chemical Co., Ltd., from the viewpoint of the performance. Within the parentheses ( ) the kinetic viscosity is a measured value at 25° C. (units: mm$^2$/s), and the units for the amino equivalence are g/mol.

Guanidino Group-Containing Compound

The guanidino group-containing compound is, for example, a guanidine compound having, as a modifying group, a hydrocarbon group mentioned above, an alkylene oxide chain mentioned above, or a silicone chain mentioned above, in which the anionically modified cellulose fibers are introduced with a hydrocarbon group or the like via an ionic bonding, to serve as a modifying group in the modified cellulose fibers. The guanidino group-containing compound includes diphenyl guanidine, ditolyl guanidine, 1,2,3-triphenyl guanidine, aminoguanidine, and arginine.

Reaction Conditions and the Like

The amount of the compound for modification used is such that the amino groups in the compound for modification, per one mol of carboxy groups owned by the oxidized cellulose fibers, are preferably in an amount of 0.01 mol or more, more preferably in an amount of 0.1 mol or more, even more preferably in an amount of 0.5 mol or more, even more preferably in an amount of 0.7 mol or more, and even more preferably in an amount of 1 mol or more, from the viewpoint of the reactivities, and the amount is such that the amino groups are preferably in an amount of 50 mol or less, more preferably in an amount of 20 mol or less, and even more preferably in an amount of 10 mol or less, from the viewpoint of purity of the manufactured product. When the compound for modification has plural amino groups, the compound is used so that a total of the number of moles of amino groups is the number of moles defined above.

During the mixing, it is preferable to use a solvent. As the solvent, it is preferable to select a solvent that dissolves a compound used, including, for example, methanol, ethanol, isopropanol (IPA), N,N-dimethylformamide (DMF), dimethyl sulfoxide (DMSO), N,N-dimethylacetamide, tetrahydrofuran (THF), acetone, methyl ethyl ketone (MEK), cyclohexanone, ethyl acetate, acetonitrile, dichloromethane, chloroform, toluene, acetic acid, 1-methoxy-2-propanol (PGME), water, and the like. These solvents can be used alone in a single kind or in a combination of two or more kinds.

The temperature during the mixing is preferably 0° C. or higher, more preferably 5° C. or higher, and even more preferably 10° C. or higher, from the viewpoint of the reactivities of the compound. In addition, the temperature is preferably 50° C. or lower, more preferably 40° C. or lower, and even more preferably 30° C. or lower, from the viewpoint of inhibiting coloration of the modified cellulose fibers. The mixing time can be appropriately set depending upon the compound used and the kinds of the solvent, and the mixing time is preferably 0.01 hours or more, and more preferably 0.1 hours or more, from the viewpoint of the reactivities of the compound, and the mixing time is preferably 48 hours or less, and more preferably 24 hours or less, from the viewpoint of productivity.

(2) Embodiment of Introduction via Amide Bonding

In the case of the introduction with a modifying group via an amide bonding, anionically modified cellulose fibers and a compound for modification may be mixed in the presence of a condensing agent, whereby an amide bonding is formed between an anionic group contained in the anionically modified cellulose fibers and an amino group of the compound for modification.

Specifically, when oxidized cellulose fibers are used as anionically modified cellulose fibers and a primary amine having the above modifying group is used as a compound for modification, the glucose constituting the cellulose fibers can be introduced with a modifying group mentioned above at a carboxy group of position C6 via an amide bonding, as shown in the formula given below:

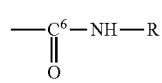

wherein $C^6$ is a carbon atom at position 6 of the glucose constituting the cellulose fibers; and R is a modifying group.

Compound for Modification

The compound for modification used in this embodiment may be any compounds capable of introducing a desired modifying group, which preferably includes amine compounds having hydrocarbon groups, alkylene oxide chains, or silicone chains, as mentioned above.

Amine Compound

The amine compound is, for example, an amine compound having, as a modifying group, a hydrocarbon group mentioned above, an alkylene oxide chain mentioned above, or a silicone chain mentioned above, in which a hydrocarbon group or the like is introduced to the anionically modified cellulose fibers via an amide bonding, to serve as a modifying group in the modified cellulose fibers.

The amine compound includes primary amines and secondary amines. Specific examples of the amine compound include the primary amines and the secondary amines out of the amine compounds having a hydrocarbon group, the amine compounds having an alkylene oxide chain, and the amine compounds having a silicone chain, which are exemplified in "(1) Embodiment of Introduction via Ionic Bonding" mentioned above.

Reaction Conditions

The amount of the compound for modification used is such that the amino groups in the compound for modification, per one mol of carboxy groups owned by the oxidized cellulose fibers, are in an amount of preferably 0.05 mol or more, more preferably 0.1 mol or more, even more preferably 0.2 mol or more, even more preferably 0.3 mol or more, and even more preferably 0.5 mol or more, from the viewpoint of increasing the reactivities and adhesive strength, and the amount is such that the amino groups are preferably in an amount of 50 mol or less, more preferably in an amount of 20 mol or less, and even more preferably in an amount of 10 mol or less, from the viewpoint of purity of the manufactured product and the jetting property. When the compound for modification has plural amino groups, the compound is used so that a total of the number of moles of amino groups is the number of moles defined above.

The condensing agent includes, but not particularly limited to, condensing agents described in Gosei Kagaku Shirizu Pepuchido Gosei (*Synthetic Chemistry Series Peptide Synthesis*) (Maruzen Publishing), page 116, or described in *Tetrahedron*, 57, 1551(2001), and the like. The condensing agent includes, for example, 4-(4,6-dimethoxy-1,3,5-triazin-2-yl)-4-methylmorpholinium chloride (may be hereinafter referred to as "DMT-MM"), and the like. In addition, it is possible to carry out the reaction with just the heat treatment without using a condensing agent.

In the amidation reaction, a solvent may be used or unused. When a solvent is used, it is preferable to select a solvent that dissolves the compound used, and specific examples of the solvent includes solvents that are exemplified in "(1) Embodiment of Introduction via Ionic Bonding" mentioned above.

The reaction time and the reaction temperature in the amidation reaction can be appropriately selected depending upon the compound used and the kinds of the solvent, or the like, and the reaction time is preferably from 1 to 24 hours, and more preferably from 10 to 20 hours, from the viewpoint of reaction yield. In addition, the reaction temperature is preferably 0° C. or higher, more preferably 5° C. or higher, and even more preferably 10° C. or higher, from the viewpoint of the reactivities. In addition, the reaction temperature is preferably 200° C. or lower, more preferably 80° C. or higher, and even more preferably 30° C. or higher, from the viewpoint of the quality of the manufactured product such as coloration.

(Finely Pulverizing Step)

By finely pulverizing cellulose fibers in any of the steps of the method for producing modified cellulose fibers (for example, before step 1, before step 2, and after step 2), the cellulose fibers of a micrometer scale can be finely pulverized to a size of a nanometer scale. Reducing an average fiber diameter to a nanometer size is preferable because the dispersibility in the resin is improved.

As the finely pulverizing treatment, a known finely pulverizing treatment can be employed. For example, when modified cellulose fibers of which average fiber diameter is a nanometer size are obtained, a treatment method using a grinder such as Masscolloider, or a treatment method using a high-pressure homogenizer or the like in a medium may be carried out.

The medium is exemplified by, for example, water; alcohols having from 1 to 6 carbon atoms, and preferably from 1 to 4 carbon atoms, such as methanol, ethanol, propanol, and 1-methoxy-2-propanol (PGME); ketones having from 3 to 6 carbon atoms such as acetone, methyl ethyl ketone, and methyl isobutyl ketone; ketones having from 2 to 4 carbon atoms such as ethyl acetate and butyl acetate; saturated hydrocarbons or unsaturated hydrocarbons having from 1 to 6 carbon atoms; aromatic hydrocarbons such as benzene and toluene; halogenated hydrocarbons such as methylene chloride and chloroform; lower alkyl ethers having from 2 to 5 carbon atoms; polar solvents such as N,N-dimethylformamide (DMF), N,N-dimethylacetamide, and dimethyl sulfoxide; and the like. These can be used alone or in a mixture of two or more kinds. The amount of the medium used may be an effective amount that can disperse the modified cellulose fibers, and the amount used, based on the modified cellulose fibers, is preferably 1 time by mass or more, and more preferably 2 times by mass or more, and preferably 500 times by mass or less, more preferably 200 times by mass or less.

As an apparatus to be used in the finely pulverizing treatment, in addition to the high-pressure homogenizer, a known dispersing machine is suitably used. For example, a disintegrator, a beating machine, a low-pressure homogenizer, a grinder, Masscolloider, a cutter mill, a ball-mill, a jet mill, a short shaft extruder, a twin-screw extruder, an ultrasonic agitator, a juice mixer for households, or the like can be used. In addition, the solid ingredient content of the modified cellulose fibers in the finely pulverizing treatment is preferably 50% by mass or less.

[Properties of Modified Cellulose Fibers]

The main properties of the modified cellulose fibers in the present invention are as follows.

(Crystal Structure)

The modified cellulose fibers have a cellulose I crystal structure, from the viewpoint of increasing the adhesive strength. The crystallinity of the modified cellulose fibers is preferably 10% or more, more preferably 15% or more, and even more preferably 20% or more, from the viewpoint of increasing the adhesive strength. In addition, the crystallinity is preferably 90% or less, more preferably 85% or less, even more preferably 80% or less, and even more preferably 75% or less, from the viewpoint of availability of the raw materials. Here, the crystallinity of the cellulose fibers as used herein refers to a cellulose I crystallinity calculated from the diffraction intensity values in accordance with X-ray diffraction method, which can be measured in accordance with the method described in Examples set forth below. Here, the cellulose I refers to a crystal form of natural cellulose, and the cellulose I crystallinity means a proportion of the amount of crystalline region occupying the entire cellulose fibers. The presence or absence of the cellulose I crystal structure can be judged by the presence of a peak at $2\theta=22.6°$ in the X-ray diffraction measurement.

(Average Fiber Diameter)

It is preferable that the modified cellulose fibers are subjected to a finely pulverizing treatment so as to have a nanometer size. Therefore, the average fiber diameter of the modified cellulose fibers is preferably 1 nm or more, and more preferably 2 nm or more, from the viewpoint of handling properties, availability, and costs, and the average fiber diameter is preferably 300 nm or less, more preferably 200 nm or less, even more preferably 150 nm or less, even more preferably 120 nm or less, and still even more preferably 20 nm or less, from the viewpoint of handling properties, dispersibility, and increase in the adhesive strength.

(Average Fiber Length)

The average fiber length of the modified cellulose fibers is preferably 10 nm or more, more preferably 30 nm or more, and even more preferably 50 nm or more, from the viewpoint of increasing the adhesive strength, and on the other hand, the average fiber length is 1000 nm or less, preferably 500 nm or less, more preferably 300 nm, and even more preferably less than 150 nm, from the viewpoint of jetting property and increase in adhesive strength.

(Average Aspect Ratio)

The average aspect ratio of the modified cellulose fibers is preferably 5 or more, more preferably 10 or more, and even more preferably 20 or more, from the viewpoint of increasing the adhesive strength, and on the other hand, the average aspect ratio is preferably 300 or less, more preferably 200 or less, even more preferably 150 or less, even more preferably 100 or less, and still even more preferably 70 or less, from the viewpoint of jetting property and increase in the adhesive strength.

By having the average fiber length and the average aspect ratio within the above range, it is excellent in adhesiveness of materials having different physical properties (for example, materials having different coefficients of linear expansion). The average fiber diameter, the average fiber length, and the average aspect ratio of the modified cellulose fibers are obtained in accordance with the methods described in Examples set forth below.

(Binding Amount and Introduction Ratio of Modifying Group)

The binding amount of the modifying group in the modified cellulose fibers is preferably 0.01 mmol/g or more, from the viewpoint of increasing the adhesive strength, and the binding amount is preferably 3.0 mmol/g or less, from the same viewpoint. When any two or more kinds of modifying groups are simultaneously introduced as the modifying groups to the modified cellulose fibers, it is preferable that the binding amount of the modified groups is within the range defined above.

The introduction ratio of the modifying group in the modified cellulose fibers is preferably 10 mol % or more, from the viewpoint of dispersibility, and the higher the introduction ratio, the more preferred, and the introduction ratio is preferably 100 mol %. When any two or more kinds of modifying groups are simultaneously introduced as the modifying groups, it is preferable that the introduction ratio is within the range defined above, in the range so that a total of the introduction ratios does not exceed the upper limit 100 mol %.

The binding amount and the introduction ratio of the modifying group can be adjusted by the kinds of a compound for modification and the amount thereof, a reaction temperature, a reaction time, the kinds of the solvent, or the like. The binding amount, mmol/g, and the introduction ratio, mol %, of the modifying group are the amount and the proportion of the modifying group introduced (bound) to an anionic group in the modified cellulose fibers. The binding amount and the introduction ratio of the modifying group in the modified cellulose fibers are calculated in accordance with the methods described in Examples set forth below, for example, in a case where an anionic group is a carboxy group.

The amount of the modified cellulose fibers in the composition of the present invention, in terms of the blending amount, calculated as cellulose without including the modifying group or the like, is preferably 0.01% by mass or more, more preferably 0.05% by mass or more, more preferably 0.1% by mass or more, more preferably 0.3% by mass or more, and even more preferably 0.5% by mass or more, from the viewpoint of increasing adhesive strength, and on the other hand, the amount is preferably 30% by mass or less, more preferably 20% by mass or less, more preferably 15% by mass or less, more preferably 10% by mass or less, more preferably 7% by mass or less, even more preferably 5% by mass or less, and even more preferably 3% by mass or less, from the viewpoint of jetting property.

[Resin]

It is preferable that the resin in the present invention is a non-water-soluble resin which is water-insoluble, or has a very low solubility in water, from the viewpoint of uses in various structures. Specifically, a resin having a solubility in water at 25° C. of 1 mg or less per 100 g of water is referred to as a non-water-soluble resin.

The solubility mentioned above is measured as follows.

One-hundred grams of a resin is added to 1 L (25° C.) of water, the mixture is stirred for 24 hours with an agitation apparatus such as a stirrer, a solution (or a suspension) thereof is then centrifuged under the conditions of at 25° C. and 3000×g for 30 minutes, to collect insoluble residues. The residues are dried at 105° C. for 3 days, and the mass after drying (dry mass) is measured. Next, it is judged that a resin having a dry mass of less than 99 mg is water-soluble, and a resin having a dry mass of 99 mg or more is non-water-soluble.

The resin used in the present invention preferably includes resins having adhesiveness alone, and resins exhibiting adhesiveness by a combined use with a curing agent. The resin may be used alone or in a mixed resin of two or more kinds.

Specific examples of the resin include epoxy resins, urethane resins, acrylic resins, vinyl chloride resins, phenoxy resins, phenolic resins, urea resins, melamine resins, polyimide resins, unsaturated polyester resins, diallyl phthalate resins, elastomeric resins, and the like.

Among the resins, curable resins (for example, epoxy resins, urethane resins, acrylic resins, phenoxy resins, phenolic resins, urea resins, melamine resins) are preferred, from the viewpoint of increasing the adhesive strength. The resin can be subjected to photo-curing and/or thermosetting treatment, depending upon the kinds of the resins. The resin to be used in the present invention is preferably a thermosetting resin.

The mass ratio of the modified cellulose fibers/the resin in the composition of the present invention, in terms of a blending amount, calculated as cellulose (without including a modifying group or the like) (provided that calculated as aninically modified cellulose, when the cellulose has an anionic group), is preferably 0.01/100 or more, more preferably 0.05/100 or more, more preferably 0.1/100 or more, more preferably 0.3/100 or more, and even more preferably 0.5/100 or more, from the viewpoint of increasing the adhesive strength, and on the other hand, the mass ratio is preferably 30/100 or less, more preferably 20/100 or less, more preferably 15/100 or less, more preferably 10/100 or less, more preferably 7/100 or less, even more preferably 5/100 or less, and even more preferably 3/100 or less, from the viewpoint of jetting property.

[Other Components]

The adhesive composition of the present invention may optionally contain a component known in the field of adhesives such as a polymerization initiator, a plasticizer, a stabilizer, a lubricant, or a surfactant. The amount of the component is not particularly limited, and an appropriate amount may be properly adopted.

[Method for Producing Adhesive Composition]

The adhesive composition of the present invention can be produced by, for example, mixing modified cellulose fibers mentioned above and a resin mentioned above or the like. Further, a solvent, a curing agent and other components mentioned above can be optionally mixed therewith.

The method for mixing each component constituting the adhesive composition is not particularly limited, which includes a general method, for example, a method using an agitator, a ultrasonic homogenizer, a high-pressure homogenizer, or the like.

The solvent which can be used during the production includes, for example, dimethylformamide, ethyl acetate, methyl methacrylate, ethanol, isopropanol, N,N-dimethylformamide (DMF), dimethyl sulfoxide (DMSO), N,N-dimethylacetamide, tetrahydrofuran (THF), diester of succinic acid and triethylene glycol monomethyl ether, acetone, methyl ethyl ketone (MEK), acetonitrile, dichloromethane, chloroform, toluene, 1-methoxy-2-propanol (PGME), acetic acid, and the like. These solvents can be used alone in a single kind, or in a combination of two or more kinds.

When a solvent is used, the amount thereof is, for example, based on 100 parts by mass of the resin, preferably 50 parts by mass or more, and more preferably 100 parts by mass or more, and on the other hand, the amount is preferably 5000 parts by mass or less, and more preferably 2000 parts by mass or less.

The adhesive composition of the present invention and the adhesive using the composition is in the form of a liquid or a solid (for example, pellets, powders) at an ambient temperature (25° C.). In the case of a solid form, an appropriate solvent can also be added thereto to produce a paste-like form, a solution, or a dispersion. In addition, the composition and the adhesive can be heated as occasion demands upon use to provide a fluid.

<Adhesive Composition and Adhesion Method>

The adhesion method of the present invention is an adhesion method including adhering a structure (preferably a metal member) with an adhesive composition (i.e., the adhesive composition of the present invention) containing
    modified cellulose fibers having a cellulose I crystal structure, an average fiber length of 1000 nm or less, and an average fiber diameter of 1 nm or more and 300 nm or less; and
    a resin.

The adhesion method of the present invention includes, for example a method including applying an adhesive composition of the present invention on a structure (or a member thereof), and pasting together with a structure of the other side (or a member thereof). The adhesive composition described above includes structural adhesive compositions.

The structural adhesive composition is an adhesive composition used in a structure such that mechanical strength is required, such as vehicles and construction buildings, and the adhesive composition is preferably used in adhering vehicle assembly products, which is an adhesive composition that is used in place of, or reinforces, conventional bonding techniques such as nut and bolts, and rivet. The adhesive composition of the present invention per se can be used as a structural adhesive, and the adhesive composition also can be used as a material for an adhesive for obtaining an adhesive by further blending with other components.

The vehicles include rockets, airplanes, drones, automobiles, boats and ships, and the like. Specifically, the adhesive composition is used in adhering a structure of automobile body of automobiles and parts such as automobile parts to produce automobile structures, and particularly, suitably used in adhesion in a technique combining spot welding and an adhesive (weld bonding technique).

The method of applying an adhesive composition mentioned above to a structure includes, but not particularly limited to, a method using, for example, a spray, a sealer gun, a dispenser, a nozzle, a paintbrush, a spatula, or the like. Among them, since the adhesive composition of the present invention has excellent jetting property, it is preferable to use a dispenser. When a dispenser is used, an embodiment includes an embodiment of jetting an adhesive composition with a dispenser, and applying the adhesive composition to a structure.

A structure is pasted together with a structure of the other side, and maintained at, for example, from −30° to 200° C. for 1 minute to 3 days, whereby the adhesion of the two structures can be completed.

The adhesive composition of the present invention has excellent binding ability to various materials, including, for example, metals such as iron, aluminum and copper; alloys such as iron steels and aluminum alloys; plastics such as polypropylene, polyamides, and polyacetals; fiber-reinforced plastics such as carbon-reinforced plastics and glass fiber-reinforced plastics; rubbers, carbon fibers, glass, ceramics, and the like, and has high strength, so that the adhesive composition can contribute to the reduction in weight of the structure, for example, vehicles, and the reduction in the welding costs. The adhesive composition of the present invention is suitably used in adhering a metal member, and more preferably used when an adhesion surface of the metal member contains aluminum.

In the adhesion method of the present invention, a side to which an adhesive composition is applied to a structure or a member thereof, i.e., an adhesion surface, is preferably made of a material containing one or more members selected from the group consisting of metals, plastics, ceramics, and glass, more preferably a metal containing a metal and/or plastics, and even more preferably a material containing a metal.

Specifically, it is preferable that the adhesion method of the present invention is a method including applying an adhesive composition of the present invention on a metal member, and pasting the metal member together with a metal member of the other side.

Here, the metal member refers to a material in which a shape is formed with a metal, which is different from powder, or the like.

It is preferable that the material of the adhesion surface used in the adhesion method of the present invention contains a metal having a coefficient of linear expansion of $20 \times 10^{-6}/°$ C. or more. The metal as described above includes aluminum, zinc, and the like. Even when the coefficient of linear expansion is high, the adhesive of the present invention inhibits heat shrinkage, so that it is assumed that the adhesive strength becomes high.

More specifically, the adhesion surface of metal members includes, for example, steel sheets, SPC steel sheets, plated steel sheets (for example, electrogalvanized steel sheets, hot-dip galvanized steel sheets, organic surface treatment steel sheets, alloying galvanized steel sheets, zinc-nickel alloy-plated steel sheets, tin-lead plated steel sheets, cationically electroplated steel sheets), aluminum sheets, aluminum alloy sheets (for example, aluminum-manganese alloy sheets, aluminum-magnesium alloy sheets), and magnesium sheets. The adhesion surface of plastics includes, for example, fiber-reinforced plastic fiber sheets made of carbon fiber-reinforced plastics, glass fiber-reinforced plastics, and the like. The adhesion surface of ceramics is made of a material including, for example, barium titanate, boron nitride, silicon nitride, lead titanate zirconate, aluminum oxide, aluminum nitride, silicon carbide, zinc oxide, zirconia, ferrite, indium oxide, silicon, and the like. The adhesion surface of glass is made of a material including, for example, soda lime glass, lead glass, borosilicate glass, silica glass, and the like. In particular, when the adhesion surface of a metal member contains aluminum, the adhesive composition of the present invention or the adhesion method of the present invention is suitably applied.

The adhesive composition of the present invention is particularly excellent in the adhesiveness of the materials that have different physical properties to each other (for example, metal materials having different coefficients of linear expansion), for example, adhesion of a metal having a coefficient of linear expansion of $20 \times 10^{-6}/°$ C. or more and a metal having a coefficient of linear expansion of less than $20 \times 10^{-6}/°$ C., or the like. Specifically, the adhesive composition is also excellent in adhesive strength of a combination of dissimilar metals (for example, steel and aluminum alloy, i.e. a metal containing iron and a metal containing aluminum, and the like). The metal containing iron can be used as a steel sheet, and the metal containing aluminum can be used as an alloy sheet. Therefore, the adhesion method of the present specification can be suitably applied to a method of adhering dissimilar metals.

With respect to the above-mentioned embodiments, the present invention further discloses an adhesive composition and an adhesion method mentioned hereinbelow.

<1> An adhesive composition containing
modified cellulose fibers having a cellulose I crystal structure, an average fiber length of 1000 nm or less, and an average fiber diameter of 1 nm or more and 300 nm or less; and
a resin.

<2> The composition according to the above <1>, wherein the average fiber length of the modified cellulose fibers is 10 nm or more and 500 nm or less.

<3> The composition according to the above <1> or <2>, wherein the average fiber length of the modified cellulose fibers is 10 nm or more and 300 nm or less.

<4> The composition according to any one of the above <1> to <3>, wherein the average fiber length of the modified cellulose fibers is 10 nm or more and less than 150 nm.

<5> The composition according to any one of the above <1> to <4>, wherein the average fiber diameter of the modified cellulose fibers is 1 nm or more and 200 nm or less.

<6> The composition according to any one of the above <1> to <5>, wherein the average fiber diameter of the modified cellulose fibers is 1 nm or more and 150 nm or less.

<7> The composition according to any one of the above <1> to <6>, wherein the average fiber diameter of the modified cellulose fibers is 1 nm or more and 120 nm or less.

<8> The composition according to any one of the above <1> to <7>, wherein the average fiber diameter of the modified cellulose fibers is 1 nm or more and 20 nm or less.

<9> The composition according to any one of the above <1> to <8>, wherein the average aspect ratio of the modified cellulose fibers is 5 or more and 200 or less.

<10> The composition according to any one of the above <1> to <9>, wherein the average aspect ratio of the modified cellulose fibers is 5 or more and 150 or less.

<11> The composition according to any one of the above <1> to <10>, wherein the average aspect ratio of the modified cellulose fibers is 5 or more and 100 or less.

<12> The composition according to any one of the above <1> to <11>, wherein the average aspect ratio of the modified cellulose fibers is 5 or more and 70 or less.

<13> The composition according to any one of the above <1> to <12>, wherein the crystallinity of the modified cellulose fibers is 10% or more and 90% or less.

<14> The composition according to any one of the above <1> to <13>, wherein the crystallinity of the modified cellulose fibers is 10% or more and 85% or less.

<15> The composition according to any one of the above <1> to <14>, wherein the crystallinity of the modified cellulose fibers is 10% or more and 80% or less.

<16> The composition according to any one of <1> to <15>, wherein the modified cellulose fibers are cellulose fibers bound with a modifying group,
wherein the modifying group contains one or more members selected from the group consisting of (a) hydrocarbon groups, (b) silicone chains, and (c) alkylene oxide chains.

<17> The composition according to <16>, wherein the cellulose fibers are anionically modified cellulose fibers.

<18> The composition according to <16> or <17>, wherein the modifying group is bound to the anionically modified cellulose fibers at an anionic group via an ionic bonding and/or a covalent bonding.

<19> The composition according to any one of the above <16> to <18>, wherein the resin is a curable resin, and preferably a thermosetting resin.

<20> The composition according to any one of the above <16> to <19>, wherein the resin is one or more resins selected from the group consisting of epoxy resins, urethane resins, acrylic resins, phenoxy resins, phenolic resins, urea resins, and melamine resins.

<21> The composition according to any one of the above <16> to <20>, wherein the mass ratio of the modified cellulose fibers/the resin, calculated as cellulose (without containing a modifying group or the like) (provided that when the cellulose contains an anionic group, calculated as anionically modified cellulose), is 0.01/100 or more and 30/100 or less.

<22> The composition according to any one of the above <16> to <21>, wherein the mass ratio of the modified cellulose fibers/the resin, calculated as cellulose (without containing a modifying group or the like) (provided that when the cellulose contains an anionic group, calculated as anionically modified cellulose), is 0.05/100 or more and 15/100 or less.

<23> The composition according to any one of the above <16> to <22>, wherein the mass ratio of the modified cellulose fibers/the resin, calculated as cellulose (without containing a modifying group or the like) (provided that when the cellulose contains an anionic group, calculated as anionically modified cellulose), is more preferably 0.1/100 or more and 10/100 or less.

<24> The composition according to any one of the above <16> to <23>, which is a structural adhesive.

<25> The composition according to any one of the above <16> to <24>, wherein the adhesion surface of the structure contains one or more members selected from the group consisting of metals, plastics, ceramics, and glass.

<26> The composition according to any one of the above <16> to <25>, for use in adhesion of vehicle assembly products.

<27> The composition according to any one of the above <16> to <26>, for use in weld bonding technique.

<28> The composition according to any one of the above <16> to <27>, which is an adhesive for metal members (for use in adhesion of a metal member).

<29> The composition according to any one of the above <16> to <28>, wherein the adhesion surface of the metal member contains a metal having a coefficient of linear expansion of $20 \times 10^{-6}/° C.$ or more.

<30> The composition according to any one of the above <16> to <29>, wherein the adhesion surface of the metal member contains aluminum.

<31> The composition according to any one of the above <16> to <30>, for use in adhesion of dissimilar metals.

<32> The composition according to any one of the above <16> to <31>, for use in adhesion of dissimilar metals having different coefficients of linear expansion.

<33> The composition according to any one of the above <16> to <32>, for use in adhesion of a metal having a coefficient of linear expansion of $20 \times 10^{-6}/° C.$ or more and a metal having a coefficient of linear expansion of less than $20 \times 10^{-6}/° C.$ <34> The composition according to any one of the above <16> to <33>, for use in a combination of a metal containing iron and a metal containing aluminum.

<35> An adhesion method including adhering a structure with an adhesive composition containing modified cellulose fibers having a cellulose I crystal structure, an average fiber length of 1000 nm or less, and an average fiber diameter of 1 nm or more and 300 nm or less; and a resin.

<36> The adhesion method according to the above <35>, wherein the adhesion surface of the structure contains one or more members selected from the group consisting of metals, plastics, ceramics, and glass.

<37> An adhesion method including adhering a metal member with an adhesive composition containing modified cellulose fibers having a cellulose I crystal structure, an average fiber length of 1000 nm or less, and an average fiber diameter of 1 nm or more and 300 nm or less; and a resin.

<38> The adhesion method according to any one of the above <35> to

<37>, wherein the adhesion surface of the metal member contains a metal having a coefficient of linear expansion of $20 \times 10^{-6}/° C.$ or more.

<39> The adhesion method according to any one of the above <35> to

<38>, wherein the adhesion surface of the metal member contains aluminum.

<40> The adhesion method according to any one of the above <35> to

<39>, for use in adhesion of dissimilar metals.

<41> The adhesion method according to any one of the above <35> to

<40>, for use in adhesion of dissimilar metals having different coefficients of linear expansion.

<42> The adhesion method according to any one of the above <35> to

<41>, for use in adhesion of a metal having a coefficient of linear expansion of $20 \times 10^{-6}/° C.$ or more and a metal having a coefficient of linear expansion of less than $20 \times 10^{-6}/° C.$ <43> The adhesion method according to any one of the above <35> to <42>, for use in a combination of a metal containing iron and a metal containing aluminum.

<44> The adhesion method according to any one of the above <35> to

<43>, wherein the adhesive composition is jetted with a dispenser, to apply the adhesive composition to the structure.

<45> The adhesion method according to any one of the above <33> to

<44>, wherein the resin is a curable resin, and preferably a thermosetting resin.

<46> The adhesion method according to any one of the above <35> to

<45>, wherein the resin is one or more resin selected from the group consisting of epoxy resins, urethane resins, acrylic resins, phenoxy resins, phenolic resins, urea resins, and melamine resins.

<47> The adhesion method according to any one of the above <35> to

<46>, wherein the mass ratio of the modified cellulose fibers/the resin, calculated as cellulose (without containing a modifying group or the like) (provided that when the cellulose contains an anionic group, calculated as anionically modified cellulose), is 0.01/100 or more and 30/100 or less.

<48> The adhesion method according to any one of the above <35> to

<47>, wherein the mass ratio of the modified cellulose fibers/the resin, calculated as cellulose (without containing a modifying group or the like) (provided that when the cellulose contains an anionic group, calculated as anionically modified cellulose), is 0.05/100 or more and 15/100 or less.

<49> The adhesion method according to any one of the above <35> to

<48>, wherein the mass ratio of the modified cellulose fibers/the resin, calculated as cellulose (without containing a modifying group or the like) (provided that when the cellulose contains an anionic group, calculated as anionically modified cellulose), is more preferably 0.1/100 or more and 10/100 or less.

<50> The adhesion method according to any one of the above <35> to

<49>, wherein the modified cellulose fibers are cellulose fibers bound with a modifying group, wherein the modifying group contains one or more members selected from the group consisting of (a) hydrocarbon groups, (b) silicone chains, and (c) alkylene oxide chains.

<51> The adhesion method according to the above <50>, wherein the cellulose fibers are anionically modified cellulose fibers.

<52> The adhesion method according to any one of the above <35> to
<51>, wherein the average fiber length of the modified cellulose fibers is 10 nm or more and 500 nm or less.
<53> The adhesion method according to any one of the above <35> to
<52>, wherein the average fiber length of the modified cellulose fibers is 10 nm or more and 300 nm or less.
<54> The adhesion method according to any one of the above <35> to
<53>, wherein the average fiber length of the modified cellulose fibers is 10 nm or more and less than 150 nm.
<55> The adhesion method according to any one of the above <35> to
<54>, wherein the average fiber diameter of the modified cellulose fibers is 1 nm or more and 200 nm or less.
<56> The adhesion method according to any one of the above <35> to
<55>, wherein the average fiber diameter of the modified cellulose fibers is 1 nm or more and 150 nm or less.
<57> The adhesion method according to any one of the above <35> to
<56>, wherein the average fiber diameter of the modified cellulose fibers is 1 nm or more and 120 nm or less.
<58> The adhesion method according to any one of the above <35> to
<57>, wherein the average fiber diameter of the modified cellulose fibers is 1 nm or more and 20 nm or less.
<59> The adhesion method according to any one of the above <35> to
<58>, wherein the average aspect ratio of the modified cellulose fibers is 5 or more and 200 or less.
<60> The adhesion method according to any one of the above <35> to
<59>, wherein the average aspect ratio of the modified cellulose fibers is 5 or more and 150 or less.
<61> The adhesion method according to any one of the above <35> to
<60>, wherein the average aspect ratio of the modified cellulose fibers is 5 or more and 100 or less.
<62> The adhesion method according to any one of the above <35> to
<61>, wherein the average aspect ratio of the modified cellulose fibers is 5 or more and 70 or less.
<63> The adhesion method according to any one of the above <35> to
<62>, wherein the crystallinity of the modified cellulose fibers is 10% or more and 90% or less.
<64> The adhesion method according to any one of the above <35> to
<63>, wherein the crystallinity of the modified cellulose fibers is 15% or more and 85% or less.
<65> The adhesion method according to any one of the above <35> to
<64>, wherein the crystallinity of the modified cellulose fibers is 20% or more and 80% or less.

EXAMPLES

The present invention will be described specifically hereinbelow by means of the following Examples and the like. Here, the following Examples are mere exemplifications of the present invention, without intending to limit the present invention thereto. Here, "ambient pressure" means 101.3 kPa, and "room temperature" means 25° C.

[Average Fiber Diameter, Average Fiber Length, and Average Aspect Ratio of Anionically Modified Cellulose Fibers and Modified Cellulose Fibers]

Water is added to measurement subject cellulose fibers to provide a dispersion of which content is 0.0001% by mass. The dispersion is added dropwise to mica (mica), and dried to provide an observation sample. A fiber height of the cellulose fibers in the observation sample, i.e. a difference in heights of areas in which the fibers are present or absent, is measured with an atomic force microscope (AFM), Nanoscope II Tapping mode AFM, manufactured by Digital Instrument, a probe used being Point Probe (NCH) manufactured by NANOSENSORS. During that measurement, 100 or more sets of cellulose fibers are extracted in a microscopic image in which the cellulose fibers can be confirmed, and an average fiber diameter is calculated from the fiber heights thereof. An average fiber length is calculated from a distance in the direction of fibers. Here, the average fiber diameter and the average fiber length are number averages. An average aspect ratio is calculated by an average fiber length/an average fiber diameter. The height analyzed in the image according to the AFM can be assumed to be a fiber diameter.

In Comparative Examples 3 and 4, it was difficult to confirm the modified cellulose fibers by the above measurement using the AFM. Therefore, in Comparative Examples 3 and 4, a solution prepared by diluting a viscous composition obtained with IPA to 0.02 wt %, and supersonically treating the dilution for 5 minutes was added one drop to mica. After air-drying, a sample subjected to a gold sputtering treatment with MSP-1S manufactured by K. K. VACUUM DEVICE was observed with an electron microscope VE-8800 manufactured by KEYENCE under the measurement conditions of an acceleration voltage of 5 kV and a spot diameter of 8.

[Average Fiber Diameter and Average Fiber Length of Raw Material Cellulose Fibers]

Deionized water is added to measurement subject cellulose fibers, to provide a dispersion, a content of which is 0.01% by mass. The dispersion is measured with a wet-dispersion type image analysis particle counter manufactured by JASCO International Co., Ltd. under the trade name of IF-3200, under the conditions of a front lens: 2 folds, telecentric zoom lens: 1 fold, image resolution: 0.835 μm/pixel, syringe inner diameter: 6,515 μm, spacer thickness: 500 μm, image recognition mode: ghost, threshold value: 8, amount of analytical sample: 1 mL, and sampling: 15%. One hundred or more sets of cellulose fibers are measured, an average ISO fiber diameter thereof is calculated as an average fiber diameter, and an average ISO fiber length is calculated as an average fiber length.

[Anionic Group Content of Anionically Modified Cellulose Fibers and Modified Cellulose Fibers]

Measurement subject cellulose fibers with the mass of 0.5 g on a dry basis are placed in a beaker, deionized water or a mixed solvent of methanol/water=2/1, volume ratio, is added thereto to make up a total volume of 55 mL. Five milliliters of a 0.01 M aqueous sodium chloride solution is added thereto to provide a dispersion, and the dispersion is stirred until the measurement subject cellulose fibers are sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-710," under the conditions of a waiting time of 60 seconds. The values of electroconductivity and a pH are measured every minute, and the measurements are continued up to a pH of 11 or so to obtain an electroconductivity curve. A titrated amount of sodium hydroxide is obtained from this electroconductivity curve, and the anionic group content of the measurement subject cellulose fibers is calculated in accordance with the following formula:

Anionic Group Content, mmol/g=[Titrated Amount of Sodium Hydroxide (mL)×Aqueous Sodium Hydroxide Solution Concentration (0.05 M)]/ [Mass of Measurement Subject Cellulose Fibers (0.5 g)]

[Aldehyde Group Content of Oxidized Cellulose Fibers]

The carboxy group content of measurement subject oxidized cellulose fibers is measured in accordance with the method for measuring an anionic group content described above.

On the other hand, separately from above, 100 g of an aqueous dispersion of measurement subject oxidized cellulose fibers, a solid ingredient content of which is 1.0% by mass, 100 g of an acetate buffer, pH 4.8, 0.33 g of 2-methyl-2-butene, and 0.45 g of sodium chlorite are added to a beaker, and the contents are stirred at 25° C. for 16 hours, to carry out an oxidation treatment of the aldehyde group remaining in the oxidized cellulose fibers. After the termination of the reaction, the cellulose fibers are washed with deionized water, to provide cellulose fibers of which aldehyde group is subjected to an oxidization treatment. A carboxy group content of a dried product obtained by a freeze-drying treatment is measured in accordance with the method for measurement of the anionic group content described above, and "a carboxy group content of the oxidized cellulose fibers which are subjected to an oxidization treatment" is calculated. Subsequently, an aldehyde group content of the measurement subject oxidized cellulose fibers is calculated according to the formula 1:

Aldehyde Group Content, mmol/g=(Carboxy Group Content of Oxidized Cellulose Fibers Which Are Subjected to Oxidization Treatment)–(Carboxy Group Content of Measurement Subject Oxidized Cellulose Fibers)   formula 1

[Solid Ingredient Content in Dispersion]

Using a halogen moisture balance manufactured by Shimadzu Corporation under the trade name of "MOC-120H," measurements with a one-gram sample are taken in a thermostat held at 150° C. every 30 seconds, and a value at which the reduction in mass is 0.1% or less of the initial amount of the sample is defined as a solid ingredient content.

[Binding Amount and Introduction Ratio of Modifying Groups of Modified Cellulose Fibers]

The binding amount of the modifying group is obtained in accordance with the following IR determination method, and a binding amount thereof and an introduction ratio thereof are calculated in accordance with the following formulas. The IR determination method is specifically taken by obtaining an infrared absorption spectrum of dried modified cellulose fibers by a measurement according to ATR method with an infrared absorption spectrophotometer (IR) Nicolet 6700 manufactured by Thermo Fisher Scientific K.K., and a binding amount and an introduction ratio of the modifying group are calculated in accordance with the following formulas A and B. The following is a case where the anionic group is a carboxy group, i.e., a case of oxidized cellulose fibers. "Peak Intensity at 1720 cm$^{-1}$" mentioned below refers to a peak intensity ascribed to a carbonyl group. Here, in a case where an anionic group is other than the carboxy group, the binding amount and the introduction ratio of the modifying group may be calculated by appropriately changing the value of wavenumber.

Binding Amount of Modifying Group, mmol/g=$a$×$(b-c)\div b$   <Formula A-1 (Case of Ionic Bonding)> wherein a is a carboxy group content of oxidized cellulose fibers, mmol/g, b is a peak intensity at 1720 cm$^{-1}$ of oxidized cellulose fibers; and c is a peak intensity at 1720 cm$^{-1}$ of modified cellulose fibers.

Binding Amount of Modifying Group, mmol/g=$d-e$   <Formula A-2 (Case of Amide Bonding)> wherein d is a carboxy group content of oxidized cellulose fibers, mmol/g; and e is a carboxy group content of modified cellulose fibers, mmol/g.

Introduction Ratio of Modifying Group, mol %=100×$f/g$   <Formula B> wherein f is a binding amount of modifying group, mmol/g; and g is a carboxy group content of oxidized cellulose fibers, mmol/g.

[Confirmation of Crystal Structure in Modified Cellulose Fibers]

The crystal structure of the modified cellulose fibers is confirmed by measuring with an X-ray diffractometer MinicFlex II manufactured by Rigaku Corporation under the following conditions.

The measurement conditions are: X-ray source: Cu/Kα-radiation, tube voltage: 30 kv, tube current: 15 mA, measurement range: diffraction angle 2θ=5° to 45°, and scanning speed of X-ray: 10°/min. A sample for the measurement is prepared by compressing the measurement subject cellulose fibers to pellets having a size having an area of 320 mm$^2$ and a thickness of 1 mm. Also, the crystallinity of the cellulose I crystal structure is calculated using X-ray diffraction intensity obtained based on the following formula C:

Cellulose I Crystallinity,%=[($I_{22.6}-I_{18.5})/I_{22.6}$]×100   <Formula C> wherein $I_{22.6}$ is a diffraction intensity of a lattice face (002 face) (angle of diffraction 2θ=22.6°), and $I_{18.5}$ is a diffraction intensity of an amorphous portion (angle of diffraction 2θ=18.5°), in X-ray diffraction.

On the other hand, in a case where a crystallinity obtained by the above formula C is 35% or less, it is preferable to calculate the value based on the formula D given below, in accordance with the description of P199-200 of "Mokushitsu Kagaku Jikken Manyuaru (*Wood Science Experimental Manual*)," edited by The Japan Wood Research Society, from the viewpoint of improving the calculation accuracy.

Therefore, in a case where a crystallinity obtained by the above formula C is 35% or less, a calculated value based on the following formula D can be used as a crystallinity:

Cellulose I Crystallinity (%)=[$A_c/(A_c+A_a)$]×100   <Formula D> wherein $A_c$ is a total sum of peak areas of a lattice face (002 face) (angle of diffraction 2θ=22.6°), a lattice face (011 face) (angle of diffraction 2θ=15.1°), and a lattice face (0-11 face) (angle of diffraction 2θ=16.2°), $A_a$ is a peak area of an amorphous portion (angle of diffraction 2θ=18.5°), each peak area being calculated by fitting the X-ray diffraction chart obtained in a Gaussian function, in X-ray diffraction.

[Cellulose Fibers in Modified Cellulose Fibers (Conversion Amount)]

The amount of the cellulose in the modified cellulose fibers (conversion amount) refers to an amount of cellulose fibers excluding the modifying group in the modified cellulose fibers. Since the modified cellulose fibers in the present invention may have a larger formula weight of the modifying group than a certain level (for example, larger than a molecular weight of glucose), when it is reasonable to explain by excluding the difference of the formula weight of the modifying group in the present specification, the amount is expressed by the amount of the cellulose constituting the modified cellulose fibers (conversion amount), not the amount of the modified cellulose fibers.

The cellulose fibers (conversion amount) in the modified cellulose fibers are measured by the following methods:

(1) In a case where "a compound for modification" to be added is one kind

The amount of the cellulose fibers (conversion amount) is calculated by the following formula E:

Amount of Cellulose Fibers (Conversion Amount), g=Mass of Modified Cellulose Fibers, g/[1+ Molecular Weight of Compound for Modification, g/mol×Binding Amount of Modifying Group, mmol/g×0.001]    <Formula E>

(2) In a case where "compounds for modification" to be added are two or more kinds The amount of the cellulose fibers (conversion amount) is calculated, taking a molar ratio of each of the compounds (i.e., a molar ratio when a total molar amount of the compounds to be added is defined as 1) into consideration.

Production Example 1—Production of Anionically Modified Fine Cellulose Fibers

Ten grams of needle-leaf bleached kraft pulp manufactured by West Fraser under the trade name of Hinton as natural cellulose was sufficiently stirred in 990 g of deionized water. Thereafter, to 10 g of the pulp were added 0.13 g of 2,2,6,6-tetramethylpiperidin-1-oxyl (TEMPO), manufactured by ALDRICH, 98% by mass, 1.3 g of sodium bromide, and 27 g of an aqueous 10.5% by mass sodium hypochlorite solution (aqueous 10.5% by mass solution) in this order.

At this time, using a pH stud titration with an automated titration instrument AUT-710 manufactured by DKK-TOA CORPORATION, an aqueous 0.5 M sodium hydroxide solution was added dropwise thereto to keep a pH at 10.5. The reaction was carried out at 20° C. at a stirring rate of 200 rpm for 120 minutes, and the reaction mixture was then sufficiently washed with deionized water, and then subjected to a dehydration treatment, to provide anionically modified cellulose fibers, a solid content of which was 27.2%. Also, the anionic group of the anionically modified cellulose fibers obtained was a carboxy group, and a carboxy group content was 1.3 mmol/g.

Production Example 2—Production of Adhesive Composition Containing Modified Cellulose Fibers The anionically modified cellulose fibers obtained in Production Example 1 in an amount of 2.0 g in absolutely dried mass and 193 g of deionized water were mixed, and the mixture was stirred with a mechanical stirrer at room temperature, 25° C., for 30 minutes. Subsequently, 4.5 g of a 1 M aqueous hydrochloric acid solution was supplied thereto, and the mixture was reacted at room temperature for one hour with stirring. After the termination of the reaction, the modified cellulose fibers were then sufficiently washed with deionized water, until the filtrate had a conductivity as measured with a compact electroconductivity meter LAQUA twin EC-33B, manufactured by HORIBA, Ltd. of 200 μs/cm or less in the conductivity measurement to remove hydrochloric acid and the formed salts. Thereafter, the reaction mixture was subjected to solvent replacement with 1-methoxy-2-propanol (PGME), to provide a dispersion of anionically modified fine cellulose fibers in which carboxy group-containing fine cellulose fibers were in a swollen state in PGME, a solid content concentration of which was 2.0%.

To 21.4 g of the dispersion obtained was mixed 0.27 g of monoamine Jeffamine M-2070, manufactured by Huntsman, U.S.A., PO/EO (molar ratio) of 10/31, and the mixture was stirred at 25° C. for one hour, to provide a dispersion of modified cellulose fibers. Thereafter, 20 g of epoxy resin A, bisphenol A type epoxy resin jER828, manufactured by Mitsubishi Chemical Corporation, viscosity of 120 to 150 P/25° C., epoxy equivalence of 184 to 194) was added thereto, and the mixture was stirred at 25° C. for additional one hour. The liquid mixture obtained was subjected to a dispersion treatment 5 times with a high-pressure homogenizer NanoVater L-ES, manufactured by YOSHIDA KIKAI CO., LTD. at 150 MPa.

The solvent was removed from the dispersion obtained, to provide a resin composition containing modified cellulose fibers and an epoxy resin.

The modified cellulose fibers obtained had a binding amount of the modifying group (the group bound with an (BO/PO) chain moiety to an alkyl group) of 0.30 mmol/g, an introduction ratio of the modifying group of 23.4 mol %, a cellulose I crystallinity of 60%, an average fiber diameter of 2.7 nm, an average fiber length of 594 nm, and an average aspect ratio of 220. The above physical properties of the modified cellulose were obtained by measuring physical properties of the modified cellulose obtained by carrying out the same dispersion step except for adding a resin, which is the same hereinafter. Here, the above monoamine is a monoamine having an alkylene oxide chain, i.e., an (EO/PO) chain.

Production Example 3—Production of Resin Composition Containing Shortened Modified Cellulose Fibers The anionically modified cellulose fibers obtained in Production Example 1 in an amount of 2.0 g in absolutely dried mass and 193 g of deionized water were mixed, and the mixture was stirred with a mechanical stirrer at room temperature, 25° C., for 30 minutes. Subsequently, 24.5 g of a 1 M aqueous hydrochloric acid solution was supplied thereto, and the mixture was reacted at room temperature for one hour with stirring. After the termination of the reaction, the modified cellulose fibers were then sufficiently washed with deionized water, until the filtrate had a conductivity as measured with a compact electroconductivity meter LAQUA twin EC-33B, manufactured by HORIBA, Ltd. of 200 μs/cm or less in the conductivity measurement to remove hydrochloric acid and the formed salts. Thereafter, a vial jar equipped with a magnetic stirrer and a stirring bar was charged with anionically modified cellulose fibers obtained in an amount of 1.8 g in absolutely dried mass, and deionized water was added thereto until the mass of the treatment liquid became 36 g. The treatment liquid was reacted at 95° C. for 12 hours, to provide an aqueous suspension of shortened anionically modified cellulose fibers.

Thereafter, the aqueous suspension was subjected to solvent replacement with PGME, to provide a dispersion of shortened anionically modified cellulose fibers in which carboxy group-containing cellulose fibers were in a swollen state in PGME, a solid content concentration of which was 2.0%. To 21.4 g of the dispersion obtained was mixed 0.27 g of monoamine Jeffamine M-2070, manufactured by Huntsman, U.S.A., PO/EO (molar ratio) of 10/31, and the mixture was stirred at 25° C. for one hour, to provide a dispersion of shortened modified cellulose fibers. Thereafter, 20 g of epoxy resin A was added thereto, and the mixture was stirred at 25° C. for additional one hour. The liquid mixture obtained was subjected to a dispersion treatment 5 times with a high-pressure homogenizer NanoVater L-ES, manufactured by YOSHIDA KIKAI CO., LTD. at 150 MPa.

The solvent was removed from the dispersion obtained, to provide a resin composition containing shortened modified cellulose fibers and an epoxy resin. The modified cellulose fibers obtained had a binding amount of the modifying group (the group bound with an (EO/PO) chain moiety to an alkyl group) of 0.30 mmol/g, an introduction ratio of the modifying group of 23.4 mol %, a cellulose I crystallinity of 65%, an average fiber length of 132 nm, an average fiber diameter of 3.3 nm, and an average aspect ratio of 40.

Production Example 4—Production of Lengthened Anionically Modified Fine Cellulose Fibers Eight grams of needle-leaf bleached kraft pulp manufactured by West Fraser under the trade name of Hinton as natural cellulose was sufficiently stirred in 760 g of deionized water. Thereafter, to 8 g of the pulp were added 0.09 g of TEMPO, manufactured by ALDRICH, Free radical, 98% by mass, 1.0 g of sodium bromide, and 21 g of an aqueous 5.0% by mass sodium hypochlorite solution (3.8 mmol/g based on 1 g of pulp) in this order.

At this time, using a pH stud titration with an automated titration instrument AUT-710 manufactured by DKK-TOA CORPORATION, an aqueous 0.5 M sodium hydroxide solution was added dropwise thereto to keep a pH at 10.5. The reaction was carried out at 20° C. at a stirring rate of 200 rpm for 120 minutes, and the dropwise addition of sodium hydroxide was then stopped, to provide a suspension of anionically modified cellulose fibers, in which the anionic group is a carboxy group, i.e., oxidized cellulose fibers.

A 0.01 M hydrochloric acid was added to a suspension of anionically modified cellulose fibers obtained to adjust its pH to 2, and the above anionically modified cellulose fibers were then sufficiently washed with deionized water, until the filtrate had a conductivity as measured with a compact electroconductivity meter LAQUA twin EC-33B, manufactured by HORIBA, Ltd. of 200 μs/cm or less in the conductivity measurement. Subsequently, the liquid mixture was subjected to a dehydration treatment, to provide anionically modified cellulose fibers in a cake-form. The carboxy group content of the anionically modified cellulose fibers obtained was 1.3 mmol/g.

Deionized water was added to the anionically modified cellulose fibers obtained so as to have a solid content concentration of 0.5%, and the mixture was stirred at 25° C. for one hour. To 80 g of the dispersion obtained was mixed 0.27 g of monoamine Jeffamine M-2070, manufactured by Huntsman, U.S.A., PO/EO (molar ratio) of 10/31, and the mixture was stirred at 25° C. for one hour, to provide a dispersion of modified cellulose fibers. The liquid mixture obtained was subjected to a dispersion treatment once with a high-pressure homogenizer NanoVater L-ES, manufactured by YOSHIDA KIKAI CO., LTD. at 100 MPa. Thereafter, PGME was added so as to have a solid content concentration of 0.17%, and the mixture was stirred at 25° C. for additional one hour. The liquid mixture obtained was subjected to a dispersion treatment once with the high-pressure homogenizer at 100 MPa.

Deionized water was removed from the dispersion obtained while adding PGME, to provide a PGME dispersion of modified cellulose fibers. Thereafter, 20 g of an epoxy resin A was added to the dispersion obtained, and the mixture was stirred at 25° C. for one hour. The liquid mixture obtained was subjected to a dispersion treatment once with a high-pressure homogenizer at 50 MPa. The solvent was removed from the dispersion obtained, to provide a resin composition containing an epoxy resin. The modified cellulose fibers obtained had a binding amount of the modifying group (a group in which an (EO/PO) moiety is bound to an alkyl group) of 0.30 mmol/g, an introduction ratio of the modifying group of 23.4 mol %, a cellulose I crystallinity of 43%, an average fiber length of 4870 nm, an average fiber diameter of 111 nm, and an average aspect ratio of 44.

Examples 1 and 2—Production of Adhesive Compositions

To 10 g of a resin composition obtained in Production Example 3 were added 0.5 g of dicyandiamide, a polyaddition type curing agent, and 0.3 g of 3-(3,4-dichlorophenyl)-1,1-dimethylurea, a curing accelerator, DCMU99 manufactured by Hodogaya Chemical Co., Ltd., and the contents were further agitated with a planetary centrifugal agitator Awatori Rentaro manufactured by THINKY CORPORATION for 2 minutes to defoam in 2 minutes, to provide an adhesive composition containing modified cellulose fibers and an epoxy resin.

Examples 3 and 4

The same procedures as in Examples 1 and 2 were carried out except that 10 g of a resin composition obtained in Production Example 2 was used in place of 10 g of a resin composition obtained in Production Example 3, to provide each of adhesive compositions.

Examples 5 and 6

The same procedures as in Examples 1 and 2 were carried out except that modified cellulose fibers using an amino-modified silicone SS-3551 manufactured by Dow Corning-Toray Silicone Co., Ltd. were used in place of 10 g of a resin composition obtained in Production Example 3, to provide each of adhesive compositions.

Examples 7 and 8

The same procedures as in Examples 3 and 4 were carried out except that the kinds of the resins contained in 10 g of a resin composition obtained in Production Example 2 were 10 g of a resin composition prepared by mixing an epoxy resin A and an acrylic resin NeoCryl A-1127 each in a ratio of 95% by mass and 5% by mass, to provide each of adhesive compositions.

Comparative Examples 1 and 2

The same procedures as in Examples 1 and 2 were carried out except that 10 g of an epoxy resin A without containing modified cellulose fibers was used in place of 10 g of a resin composition obtained in Production Example 3, to provide each of adhesive compositions.

Comparative Examples 3 and 4

The same procedures as in Examples 1 and 2 were carried out except that 10 g of a resin composition obtained in Production Example 4 was used in place of 10 g of a resin composition obtained in Production Example 3, to provide each of adhesive compositions.
[Evaluation of Physical Properties]

The properties of the adhesive compositions obtained were evaluated in accordance with the following Test Examples 1 and 2. The results are shown in Tables 1 to 3.

Test Example 1—Shearing Adhesive Strength Test: Adhesion of Similar Materials

According to a shearing strength test method as prescribed in JASO M353, an adhesive composition obtained was applied to an object to be adhered, i.e. a steel sheet in a coating thickness of 0.15 mm so that an adhesion surface was a laminate of two pieces of cold-rolled steel sheets SPCC-SD (100 mm×25 mm×1.6 mm) of 12.5 mm, and an adhesive composition that was pushed out from the laminate was removed. Thereafter, the laminate was heat-cured under the conditions of holding at 130° C. for 2 hours, to produce a shearing test piece. The test piece obtained was subjected to a test with a table top model precision universal tester AGS-X manufactured by SHIMADZU CORPORATION with a distance between chucks of 111.5 cm at room temperature, 25° C., and a tensile speed of 5 mm/minute.

Here, the surface treatment method before the use of the cold-rolled steel sheets SPCC-SD as used in this test example was carried out according to a surface treatment method of test piece materials as prescribed in JASO M353, in which the steel sheets used were degreased with acetone, dried, then immersed in anti-corrosive oil WD-40, and then allowed to stand therein for 24 hours to allow degreasing.

The numerical values of the shearing adhesive strength were expressed as an index for the adhesive compositions obtained in Examples 1, 3, 5, and 7 and Comparative Example 3, where the value for the adhesive composition obtained in Comparative Example 1 was defined as 100.

Test Example 2—Shearing Adhesive Strength Test: Adhesion of Dissimilar Materials The same procedures as in Test Example 1 were carried out except that a test was conducted with one sheet each of a cold-rolled steel sheet SPCC-SD and an aluminum alloy sheet A5052P were used in place of the two sheets of cold-rolled steel sheets SPCC-SD.

The numerical values of the shearing adhesive strength were expressed as an index for the adhesive compositions obtained in Examples 2, 4, 6, and 8, where the value of the adhesive composition obtained in Comparative Example 2 was defined as 100.

Test Example 3—Evaluation of Jetting Ability

The evaluation of the jetting ability of an adhesive composition can be qualitatively made from a jetting test of an experimental machine. In this test, a 0.5 g sample was loaded in a 2 mL syringe, and the evaluation was made by whether or not the sample had a viscosity in a jettable region when the sample was pressed out manually from the syringe at room temperature.
Evaluation Criteria:
A: jettable;
B: difficult in jetting (jetting is feasible to a certain extent with one hand);
C: difficult in jetting (jetting is feasible to a certain extent if both hands are used); and
D: jetting being impossible.

TABLE 1

| Components of adhesive composition | | Examples | | | |
|---|---|---|---|---|---|
| | | 1 | 2 | 3 | 4 |
| Curable resin (A) | | Epoxy resin (bis A type) | | | |
| Modified cellulose fibers (B) | Kinds of modifying group | JEFFAMINE M-2070 | | | |
| | Content of modifying group, % by mass | 66.7 | | 66.7 | |
| | Average fiber length, nm | 132 | | 594 | |
| | Average aspect ratio | 40 | | 220 | |
| | Mass ratio [cellulose fibers/(A)] *1 | 0.02 | | 0.02 | |
| Curing agent (C) | Kinds | Dicyandiamide | | | |
| | Mass ratio [(C)/(A)] | 0.05 | | | |
| Others | Curing accelerator | DCMU99 | | | |
| Heating conditions | | 130° C., 2 hr | | | |

TABLE 1-continued

| | Components of adhesive composition | | Examples | | | |
|---|---|---|---|---|---|---|
| | | | 1 | 2 | 3 | 4 |
| Evaluation | Adhesive strength | Kinds of materials to be adhered | Steel sheet/ steel sheet | Steel sheet/ aluminum alloy sheet | Steel sheet/ steel sheet | Steel sheet/ aluminum alloy sheet |
| | | Shearing adhesive strength | 132 | 720 | 114 | 159 |
| | Jetting ability | | A | | C | |

*1: Mass ratio of unmodified cellulose fibers based on the curable resin (A)

TABLE 2

| | Components of adhesive composition | | Examples | | | |
|---|---|---|---|---|---|---|
| | | | 5 | 6 | 7 | 8 |
| | Curable resin (A) | | Epoxy resin (bis A type) | | Epoxy resin (bis A type): 95% Acrylic resin: 5% | |
| Modified cellulose fibers (B) | Kinds of modifying group | | Amino-modified silicone SS-3551 | | JEFFAMINE M-2070 | |
| | Content of modifying group, % by mass | | 100 | | 66.7 | |
| | Average fiber length, nm | | 132 | | 594 | |
| | Average aspect ratio | | 40 | | 220 | |
| | Mass ratio [cellulose fibers/(A)] *1 | | 0.02 | | 0.02 | |
| Curing agent (C) | Kinds | | Dicyandiamide | | | |
| | Mass ratio [(C)/(A)] | | 0.05 | | | |
| Others | Curing accelerator | | DCMU99 | | | |
| Heating conditions | | | 130° C., 2 hr | | | |
| Evaluation | Adhesive strength | Kinds of materials to be adhered | Steel sheet/ steel sheet | Steel sheet/ aluminum alloy sheet | Steel sheet/ steel sheet | Steel sheet/ aluminum alloy sheet |
| | | Shearing adhesive strength | 129 | 709 | 126 | 137 |
| | Jetting ability | | A | | C | |

*1: Mass ratio of unmodified cellulose fibers based on the curable resin (A)

TABLE 3

| | Components of adhesive composition | | Comparative Examples | | | |
|---|---|---|---|---|---|---|
| | | | 1 | 2 | 3 | 4 |
| | Curable resin (A) | | Epoxy resin (bis A type) | | Epoxy resin (bis A type) | |
| Modified cellulose fibers (B) | Kinds of modifying group | | | | JEFFAMINE M-2070 | |
| | Content of modifying group, % by mass | | | | 66.7 | |
| | Average fiber length, nm | | | | 4870 | |
| | Average aspect ratio | | | | 44 | |
| | Mass ratio [cellulose fibers/(A)] *1 | | | | 0.02 | |
| Curing agent (C) | Kinds | | Dicyandiamide | | | |
| | Mass ratio [(C)/(A)] | | 0.05 | | | |
| Others | Curing accelerator | | DCMU99 | | | |
| Heating conditions | | | 130° C., 2 hr | | | |

TABLE 3-continued

| Components of adhesive composition | | | Comparative Examples | | | |
|---|---|---|---|---|---|---|
| | | | 1 | 2 | 3 | 4 |
| Evaluation | Adhesive strength | Kinds of materials to be adhered | Steel sheet/ steel sheet | Steel sheet/ aluminum alloy sheet | Steel sheet/ steel sheet | Steel sheet/ aluminum alloy sheet |
| | | Shearing adhesive strength | 100 | 100 | 34 | Undeterminable |
| | | Jetting ability | A | | | D |

*1: Mass ratio of unmodified cellulose fibers based on the curable resin (A)

It can be seen from Tables 1 to 3 that the adhesive compositions of the present invention containing modified cellulose fibers having an average fiber length of 1000 nm or less, as in Examples 1 to 8, have more improved shearing adhesive strength, making them suitable for structural adhesives.

It can be seen from the comparisons of Examples 1 with 3 and Examples 2 with 4 that Examples 1 and 2 in which modified cellulose fibers having a shorter average fiber length and a smaller average aspect ratio are used have excellent adhesive strength and at the same time excellent jetting ability.

It can be seen from the comparison of Example 2 with Comparative Example 2 (adhesive strength being 7.2 times) with the comparison of Example 1 with Comparative Example 1 (adhesive strength being 1.3 times) that the adhesive composition of the present invention has excellent adhesiveness of the materials having different physical properties with each other, for example, different materials including a metal having a large coefficient of linear expansion.

INDUSTRIAL APPLICABILITY

The adhesive composition of the present invention can be utilized in structural adhesion of vehicle assembly products and the like.

The invention claimed is:

1. An adhesive composition comprising
modified cellulose fibers having a cellulose I crystal structure, an average fiber length of less than 150 nm, and an average fiber diameter of 1 nm or more and 300 nm or less; and
a resin;
wherein the modified cellulose fibers are cellulose fibers bound with a modifying group, wherein the modifying group comprises one or more members selected from the group consisting of (a) hydrocarbon groups, (b) silicone chains, and (c) alkylene oxide chains.

2. The adhesive composition according to claim 1, wherein the mass ratio of the modified cellulose fibers/resin in the composition is 0.01/100 or more and 30/100 or less, wherein the mass ratio is calculated based on the amount of cellulose without including the modified group, with the proviso that the mass ratio is calculated based on the amount of anionically modified cellulose when the cellulose has an anionic group.

3. The adhesive composition according to claim 1, wherein the amount of the modified cellulose fibers in the composition, calculated as the blending amount, is 0.01% by mass or more and 30% by mass or less, wherein the blending amount is calculated based on the amount of cellulose without including the modified group, with the proviso that the blending amount is calculated based on the amount of anionically modified cellulose when the cellulose has an anionic group.

4. The adhesive composition according to claim 1, wherein the average aspect ratio of the modified cellulose fibers is 200 or less.

5. The adhesive composition according to claim 1, wherein the binding amount of the modifying group in the modified cellulose fibers is 0.01 mmol/g or more and 3.0 mmol/g or less.

6. The adhesive composition according to claim 1, wherein the crystallinity of the modified cellulose fibers is 10% or more, and 90% or less.

7. The adhesive composition according to claim 1, wherein the cellulose fibers are anionically modified cellulose fibers.

8. The adhesive composition according to claim 7, wherein the modifying group is bound to an anionic group of the anionically modified cellulose fibers via an ionic bonding and/or a covalent bonding.

9. The adhesive composition according to claim 1, wherein the resin is a curable resin.

10. The adhesive composition according to claim 1, wherein the resin is one or more resins selected from the group consisting of epoxy resins, urethane resins, acrylic resins, phenoxy resins, phenolic resins, urea resins, and melamine resins.

11. An adhesive composition comprising
modified cellulose fibers having a cellulose I crystal structure, an average fiber length of less than 150 nm, and an average fiber diameter of 1 nm or more and 300 nm or less; and
one or more resins selected from the group consisting of epoxy resins, urethane resins, acrylic resins, phenoxy resins, phenolic resins, urea resins, and melamine resins,
wherein the modified cellulose fibers are anionically modified cellulose fibers bound with a modifying group,
wherein the modifying group comprises one or more members selected from the group consisting of (a) hydrocarbon groups, (b) silicone chains, and (c) alkylene oxide chains, and
wherein the modifying group is bound to an anionic group of the anionically modified cellulose fibers via an ionic bonding and/or a covalent bonding.

12. The adhesive composition according to claim 1, which is a structural adhesive composition.

13. The adhesive composition according to claim 1, adapted for use in adhesion of a metal member.

14. The adhesive composition according to claim 13, wherein an adhesion surface of the metal member comprises aluminum.

15. The adhesive composition according to claim 13, adapted for use in adhesion of dissimilar metals.

16. The adhesive composition according to claim 15, wherein the dissimilar metals have different coefficients of linear expansion.

17. The adhesive composition according to claim 16, adapted for use in adhesion of a first metal having a coefficient of linear expansion of $20\times10^{-6}/°$ C. or more and a second metal having a coefficient of linear expansion of less than $20\times10^{-6}/°$ C.

18. An adhesion method comprising adhering a structure with an adhesive composition comprising
- modified cellulose fibers having a cellulose I crystal structure, an average fiber length of less than 150 nm, and an average fiber diameter of 1 nm or more and 300 nm or less; and
- a resin;
- wherein the modified cellulose fibers are cellulose fibers bound with a modifying group, wherein the modifying group comprises one or more members selected from the group consisting of (a) hydrocarbon groups, (b) silicone chains, and (c) alkylene oxide chains.

* * * * *